No Printed Specification Available
7140½X
A. Hale, 2 sheets - Sheet 1
Hay Press,
Patented June 26, 1832.
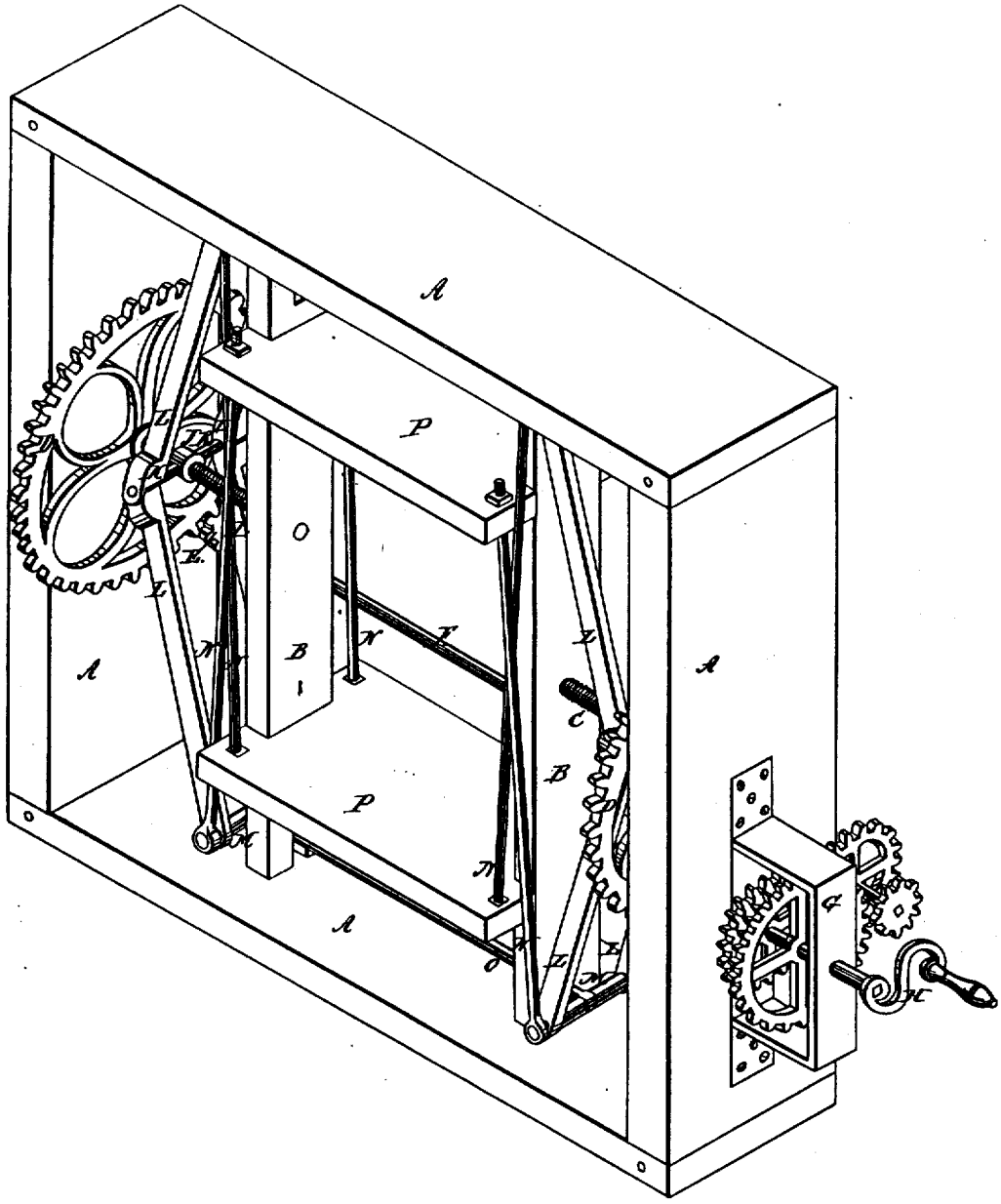
AM. PHOTO-LITHO. CO. N.Y. (OSBORNE'S PROCESS)

7140½X

A. HALE.
HAY PRESS.

Patented June 26, 1832.

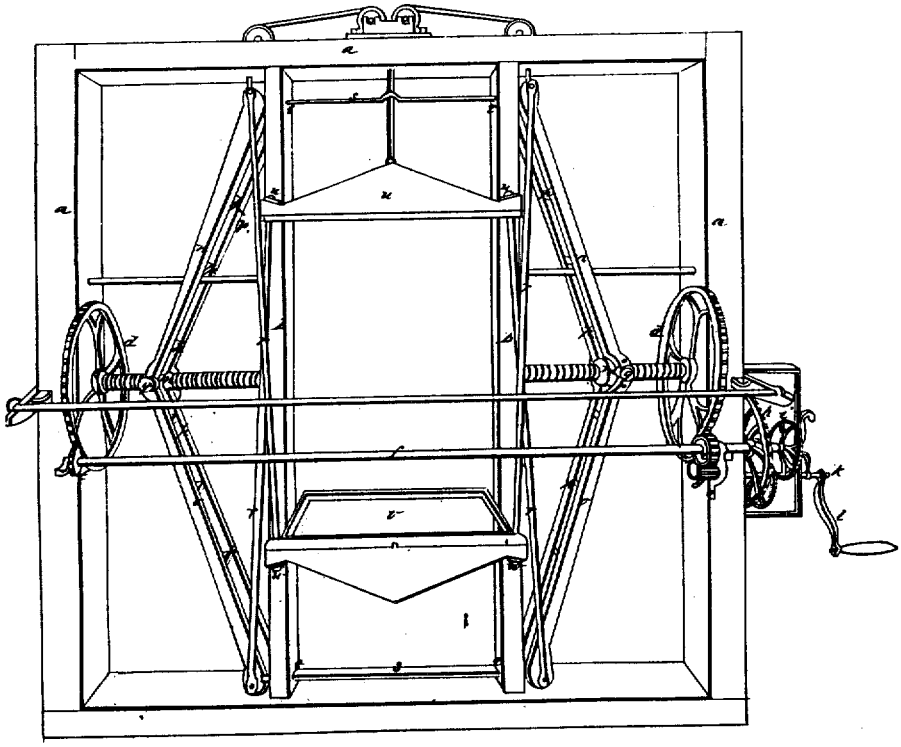

References.

a. Timber frame.
b.b. Platen & Toggle guides.
c.c. Toggle Screws.
d.d. Dentated Wheels.
e.e. Pinion wheels which drive d.d.
f. Arbor of Pinion wheels.
g. Intermediate Pinion.
h.i Two other wheels on the arbor f
k. Crank arbor.
l. Crank.
m.m. Spherical Nuts.
n.o. n.o. Toggle joints.
p.p. u. Slats or rounds of do.
q.q Hinges of Toggle Bars.
r.r. Platen Rods.
s.s. Rods. connecting ends of Toggles.
t.t. Mortices.
u.v. Platens.
w.w. Nuts to Platen Rods.

State of Massachusetts.
County of Suffolk. ss.
On this thirty first day of December. A.D 1841. before the subscriber
personally appeared Aaron Hale of Boston in the State of Massa-
chusetts and made oath that he is the inventor of an improvement
in the Standing Press called the Boston Press for which Letters Patent
were granted to him on the twenty sixth day of June A.D. 1832. and that
the annexed drawing is as he verily believes a true delineation of the
invention described in said Letters Patent R. H. Eddy.
Justice of Peace

THE NORRIS PETERS CO., PHOTO-LITHO., WASHINGTON, D. C.

TEMPORARY NOTICE of BEST AVAILABLE IMAGE

U. S. PATENT AND TRADEMARK OFFICE

THE SCANNED IMAGES OF PATENT NUMBER 7140 ½ X FOR THE ISSUE DATE OF 6/26/1832 ARE NOT THE COMPLETE ORIGINAL DOCUMENT, BUT CONTAIN A COPY OF THE BEST AVAILABLE TEXT AND IMAGE DATA FROM VARIOUS SOURCES.

WHEN THE MISSING INFORMATION BECOMES AVAILABLE, THE DOCUMENT WILL BE RESCANNED AND REPLACED.

ANY QUESTIONS SHOULD BE DIRECTED TO THE DATA MAINTENANCE BRANCH BY TELEPHONE AT (703) 306-3116.

TEMPORARY NOTICE of BEST AVAILABLE IMAGE